Oct. 15, 1968    R. McFADYEN ET AL    3,405,466
DESK INDEXING DEVICE
Filed Aug. 18, 1966    3 Sheets-Sheet 1
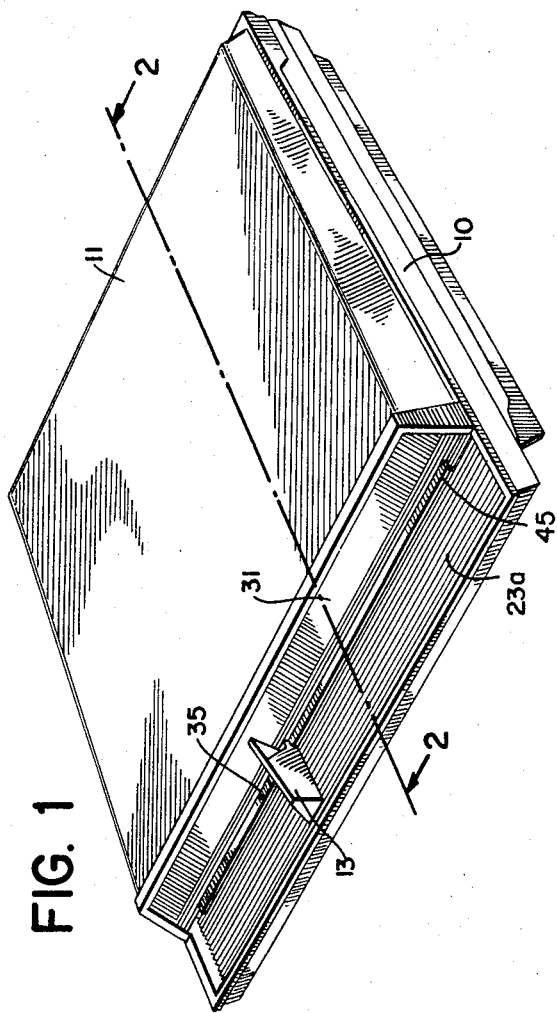
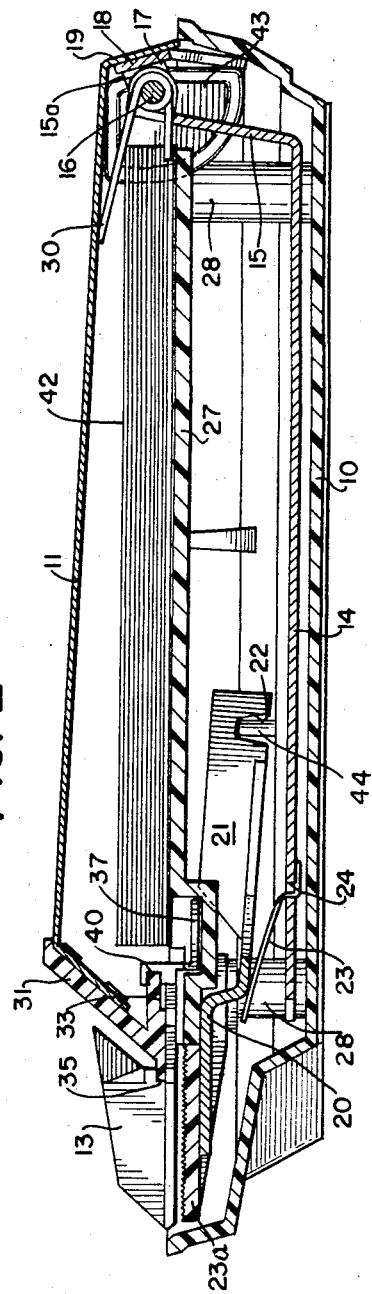
INVENTORS
RICHARD McFADYEN
JAMES H. GILTZOW
BY Darby & Darby
ATTORNEYS Oct. 15, 1968 R. McFADYEN ET AL 3,405,466
DESK INDEXING DEVICE
Filed Aug. 18, 1966 3 Sheets-Sheet 2

INVENTORS
RICHARD McFADYEN
JAMES H. GILTZOW
BY Darby & Darby
ATTORNEYS

Oct. 15, 1968  R. McFADYEN ET AL  3,405,466
DESK INDEXING DEVICE
Filed Aug. 18, 1966  3 Sheets-Sheet 3
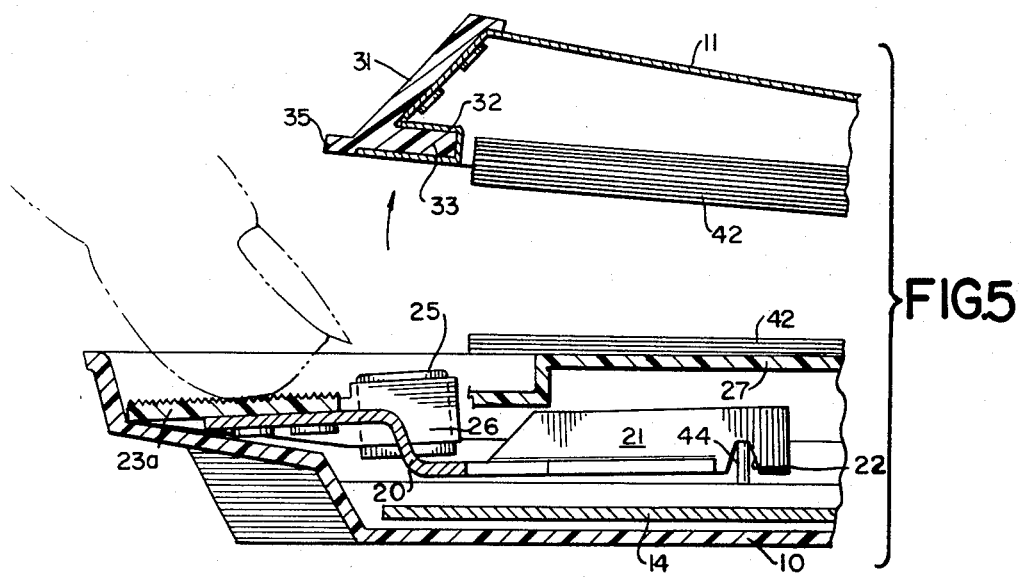
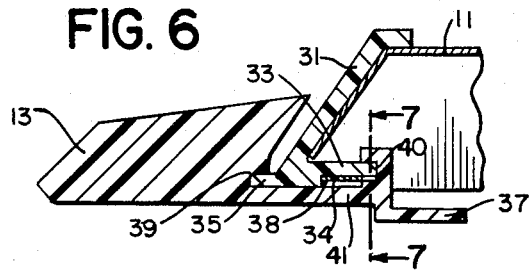
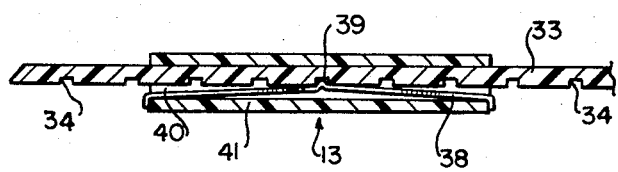
INVENTORS
RICHARD McFADYEN
JAMES H. GILTZOW
BY *Darby & Darby*
ATTORNEYS

# 3,405,466
DESK INDEXING DEVICE
Richard McFadyen, Essex Fells, and James H. Giltzow, Roseland, N.J., assignors to Ketcham & McDougall, Inc., Roseland, N.J., a corporation of New Jersey
Filed Aug. 18, 1966, Ser. No. 573,391
3 Claims. (Cl. 40—104)

ABSTRACT OF THE DISCLOSURE

A desk indexing device for displaying a set of cards having a depressible latching member on the lower housing section. A magnet is located at each end of the depressible latching member and the indexing lever is located therebetween.

---

This application relates to apparatus for the selective indexing and viewing of information displayed on cards.

In the past, several types of apparatus have been used for displaying information printed or written upon cards and for selectively choosing the card to be displayed. This apparatus has usually involved a number of features including complicated selection mechanisms and catch mechanisms which have contributed to their high cost and their relatively low efficiency. Further, the physical bulk of the mechanisms employed in these previous devices has diminished their aesthetic appeal, ease of handling, and efficiency.

It is an object of the present invention to provide apparatus for selectively displaying information, shown upon cards, said apparatus having a slim configuration relative to the number of cards to be displayed and having improved operating characteristics. The invention may be used as a telephone index, for example.

Our invention will be described in greater detail below and in the drawings, in which:

FIGURE 1 is a perspective view of the exterior of the apparatus of our invention;

FIGURE 2 is a sectional view along line 2–2 of FIGURE 1;

FIGURE 5 is a partial sectional view of our invention showing the top mechanism open;

FIGURE 6 is an enlarged view of the indexing mechanism; and

FIGURE 7 is a sectional view along line 7–7 of FIGURE 6.

Figure 3:
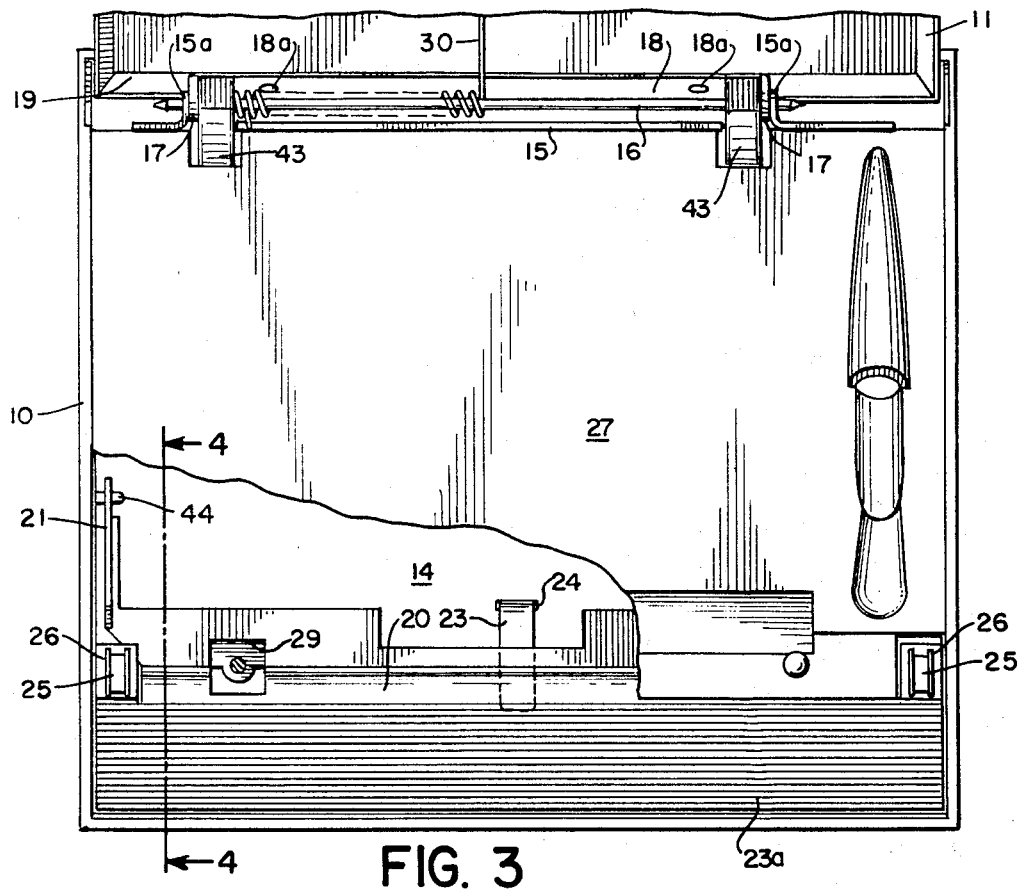
FIGURE 3 is a plan view partially cut away showing the apparatus of our invention.

Referring to FIGURES 1, 2 and 3, the apparatus of our invention comprises a lower housing section 10 and an upper housing section 11. Housing sections 10 and 11 may be made of any suitable material including plastics, metals or both, and may generally be of any configuration designed aesthetically to please the user of the apparatus. As shown in FIGURE 2, the metal plate 14 is riveted to the bottom interior surface of the housing 10. The rear portion of the base plate 14 has an upstanding wall 15 whose top edge is above the top portion of housing 10. Two portions of the upstanding wall 15 are cut back at right angles to form mountings 15a for rod 16, which extends partway across the housing. Hingedly mounted on rod 16 by means of mountings 17 is a narrow long flat attaching member 18 which is fixedly attached by means of rivets 18a to the rear wall 19 of housing 11, thereby providing a pivot for top housing 11.

Affixed to rod 16 at the back of the assembly is a spring 30 which engages wall 15 of member 14 with one end of the spring and engages the interior of top housing 11 with the opposite end of the spring. In operation, upon release of the latch member, spring 30 raises upper housing 11.

Figure 4:
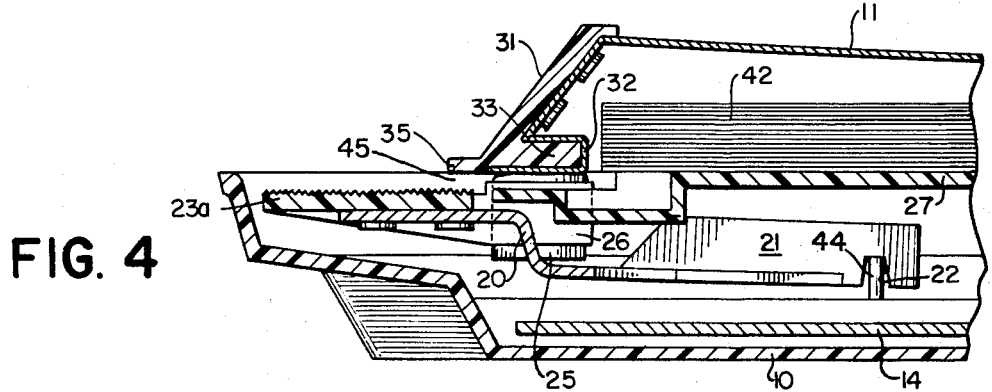
FIGURE 4 is a partial sectional view of FIGURE 3 along line 4–4 with the top housing member closed.

Referring to FIGURE 4, a fulcrum 44 is molded into the interior side walls of housing 10 on both side of the housing. A substantially Z-shaped metal plate 20 is provided with a pair of upstanding side walls 21 which are in turn provided with a notch 22 designed to rotatably mount on top of fulcrum 44. As shown in FIGURE 2, a spring member 23 is notched into base plate 14 at notch 24 at its rear end and engages the bottom of member 20 at its front end, thereby pressing the front edge of member 20 upwards and providing resistance to downward movement of member 20. The upper surface of member 20 has affixed to it a strip 23a of plastic decorative material which acts as a depressible portion in operation of the device.

As shown in FIGURE 3 and 4, a pair of magnets 25 are located on each side of the depressible member 23a and are held in place by means of holders 26, so as to move with member 23a as the forward edge of part 23a is depressed. A whole piece 25a is affixed to each side of magnets 25 in a vertical direction.

Affixed to the interior of housing 10 is a card platform 27 which is supported on four posts 28 which are screwed or riveted to the lower housing 10. A hole 29 is provided on each side of Z-shaped member 20 to permit the posts to pass through member 20 and be affixed to the bottom of the housing 10. Card platform 27 holds the index cards, as will be explained below.

Top housing 11 is further provided with a decorative front portion 31 which may be suitably indexed to the material contained upon the cards located within the device. Further, as shown in FIGURE 5, each end of front portion 31 is provided with a U-shaped magnetically attractable metal clip 32 which is mounted on horizontal leg 33 of piece 31. Each of the U-shaped metal clips 32 is located above its respective magnet 25, so as to be magnetically held to magnet 25 when depressible portion 23a is in a horizontal position and the top housing is closed. Depressible member 23a is located slightly below the top edge of bottom housing 10 so as to provide a notch 45 between the lower edge of the front decorative member 31 and the top of the depressible member 23a. The space is of sufficient size to allow horizontal middle portion 41 of the indexing pointer 13 to pass under member 31 with sufficient clearance so that it can move across the front of the housing. Magnets 25 are slightly raised above depressible member 23a so as to contact the magnetically attractable clip 32 and are located in a horizontal plane between the ends of notch 45 and the exterior of the housing.

Referring to FIGURES 6 and 7, the mid-portion of leg 33 is provided with a series of detents 34. Indexing pointer 13 is mounted on the decorative front member 31 by means of a U-shaped cut-out 39 in its rear edge which engages horizontal lip 35 of member 31 and also by means of U-shaped cut-out 40 which engages the rear lip 33. Horizontal middle portion 41 of the indexing mechanism is wider than the indexing pointer 13. A spring 38 is provided on the upper surface of portion 41 and engages each end of portion 41. Spring 38 is provided with a projecting lug 39 on its top center surface. Lug 39 engages detents 34 of lip 33 so that selective engagement can be accomplished as the indexing pointer slides across the width of the housing. Indexing pointer 13 is also provided with an inwardly extending finger 37 which is designed to engage the index cards contained within the apparatus, as will be explained in more detail below.

As shown in FIGS. 2 and 4, located within the housing is a set of index cards 42. The index cards are mounted on support 43 which is in turn mounted on rod 16 to hingedly support the cards. The front edges of the index cards are progressively cut away or cut back at different locations, so that when cards 42 are piled on top of each other, a small section of each card is visible to finger 37 without interference from preceding or successive cards, different portions of different cards thus being exposed.

In order to operate the apparatus of our invention, indexing pointer 13 is slidably moved across the front of member 31 until it points to the designation of the card that is desired to be viewed. Designations may be permanently or temporarily affixed to member 31. At this point, finger 37 will be located under the card above the card desired to be viewed. Depressible portion 23a is then moved downward, disengaging magnet 25 from the metal clip 32. Spring 30 then forces the upper housing 11 upwardly carrying with it those cards above the cards desired to be viewed. When it is desired to view another card, the top is simply closed and the indexing pointer 13 moved to the location of the new card desired to be viewed. Member 23a is then depressed causing the card now selected to be viewable.

It is to be appreciated by those skilled in the art that several modifications of this device are within the scope of our invention. For instance, the indexing pointer 13 can be located on the side of the housing 11 and the complementary recesses on the index cards can be located on the side to operate in conjunction with the indexing pointer.

What is claimed is:
1. A card display device comprising in combination a bottom housing member, a top housing member hingedly connected thereto parallel to one edge of the bottom housing member and having an elongated notch in one edge on an unhinged side, a set of index cards, said index cards having one edge partially cut back at different locations so as to expose different portions of said cards, said index cards being hingedly attached at one edge of the lower housing member, a depressible member attached to the bottom housing member on the same side as the side containing the notch in the upper housing member, a pair of magnets, one magnet being attached to each end of the depressible member beyond the ends of the notch, magnetically attractable means located on the upper housing member so as to be engageable by said magnets and means attached to the top housing member and located in said notch for selectively engaging the index cards and holding them when the top housing member is open.

2. A card display device comprising in combination a bottom housing member, a top housing member hingedly connected thereto parallel to one edge of the bottom housing member, a set of index cards, said index cards having one edge partially cut back at different locations so as to expose different portions of said cards, said index cards being hingedly attached at one edge to one of said housing members, a magnet affixed to one of said housing members, magnetically attractable means affixed to the other of said housing members and located so as to be held by said magnet when said housing members are in a closed position, a depressible member attached to the lower housing section for separating said magnet and magnetically attractable means and means attached to the top housing member for selectively engaging the index cards and holding them when the top housing member is opened.

3. A card display device is described in claim 2 further including a second magnet and a second magnetically attractable means, said first and second magnet and said first and second magnetically attractable means being located so as to prevent interference with said means for selectively engaging the index cards.

References Cited

UNITED STATES PATENTS

| | | | |
|---|---|---|---|
| 3,061,963 | 11/1962 | Buckley | 40—104 |
| 3,192,658 | 7/1965 | McGurn | 40—104 |
| 3,289,335 | 12/1966 | Neilsen | 40—104 |

EUGENE R. CAPOZIO, *Primary Examiner.*

W. J. CONTRERAS, *Assistant Examiner.*